United States Patent [19]
Terriss et al.

[11] Patent Number: 5,964,823
[45] Date of Patent: Oct. 12, 1999

[54] CALCULATOR WITH A DISPLAYED COMMERCIAL MESSAGE

[75] Inventors: Howard L. Terriss, New Rochelle; Marc Chase Weinstein, New York, both of N.Y.

[73] Assignee: Chase Marketing International, Mamaroneck, N.Y.

[21] Appl. No.: 09/013,052

[22] Filed: Jan. 26, 1998

[51] Int. Cl.⁶ ...................................................... G06F 3/00

[52] U.S. Cl. ........................................... 708/160; 345/113

[58] Field of Search ..................................... 708/160, 163, 708/174; 345/33–34, 113–115, 169, 901–903

[56] References Cited

U.S. PATENT DOCUMENTS

| | | | |
|---|---|---|---|
| 4,104,727 | 8/1978 | Washizuka et al. . | |
| 4,988,025 | 1/1991 | Lipton et al. ............................ | 708/163 |
| 5,604,688 | 2/1997 | Chu et al. ................................ | 708/160 |

*Primary Examiner*—Tan V. Mai
*Attorney, Agent, or Firm*—Myron Amer PC

[57] ABSTRACT

A hand held calculator with keyboard buttons to display numbers on a screen as a display foreground, and a rearwardly disposed panel with an imprinted commercial message expressed in words/letters as a display background, in which although the foreground is over the background, a viewer is not confused because the numbers and letters are readily distinguishable from each other.

1 Claim, 1 Drawing Sheet

CALCULATOR WITH A DISPLAYED COMMERCIAL MESSAGE

The present invention relates generally to improvements for a hand-held calculator of a type having numbers displayed on a screen, wherein the improvements incorporate the displayed numbers with a commercial message to significantly enhance the utility of the calculator as an advertising premium.

Common experience demonstrates an understanding that objects that command attention, such as a wall mounted clock in a restaurant and bar or the like, serve an additional advertising function, such as presenting the imprinted name of a beverage on the clock face to patrons who, to determine the time of day, look at the clock. These known combination time-of-day/commercial message clocks require a reasonably large display area since the time of day numerical indicia and the commercial message are separated from each other for ready recognition in the display area.

Broadly, it is an object of the present invention to provide an improved display, primarily for a hand-held calculator, overcoming the foregoing and other shortcomings of the prior art.

More particularly, it is an object to present within a significantly reduced display area of a hand-held calculator a numerical and text display in superimposed relation, i.e. as separated foreground and background, in which the positioning as noted advantageously uses the available small-sized display area, but without adverse effect on the recognition of each, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
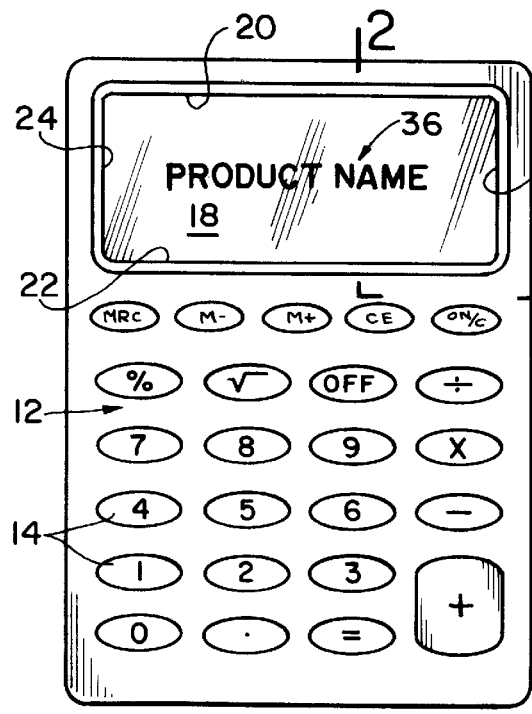
FIG. 1 is a front elevational view of a calculator with a display according to the present invention.
Figure 3:
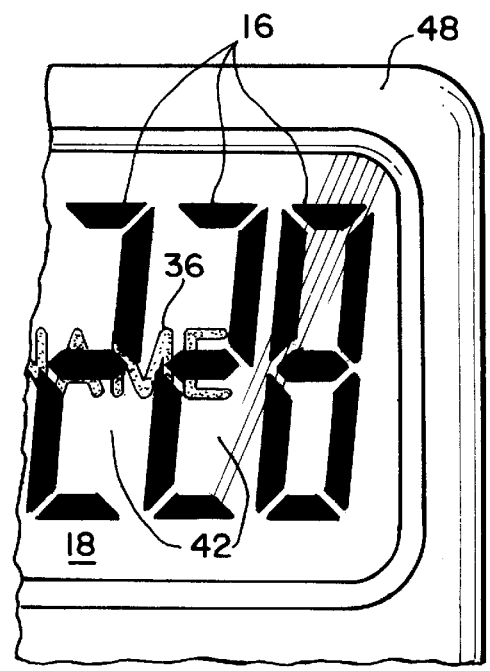
FIG. 3 is a view similar to FIG. 2, but illustrating the within inventive display of the calculator.

Shown in FIG. 1 is a known hand-held calculator, generally designated 10, having a keyboard 12, with depressible buttons, individually and collectively designated 14, which in a known manner are effective when pressed to cause numbers, as exemplified by those designated 16 in FIG. 3, to appear in a display opening and on what is usually referred to as a display screen 18. The display opening or screen 18 is that bounded by calculator housing spaced-apart top, bottom and opposite side edges 20, 22, 24 and 26 respectively.

Figure 4:
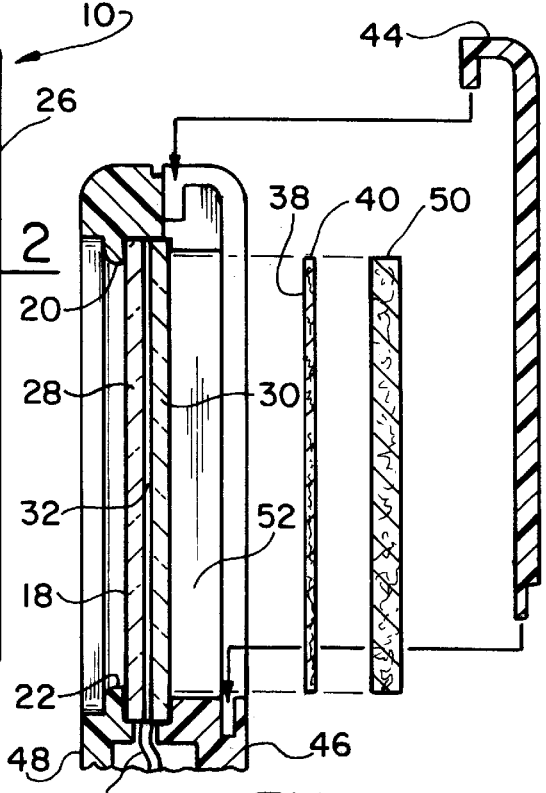
FIG. 4 is a cross sectional view of the calculator as taken along line 4—4 of FIG. 2, illustrating the components in exploded perspective and to be understood as viewed from left to right in this figure.
Figure 2:
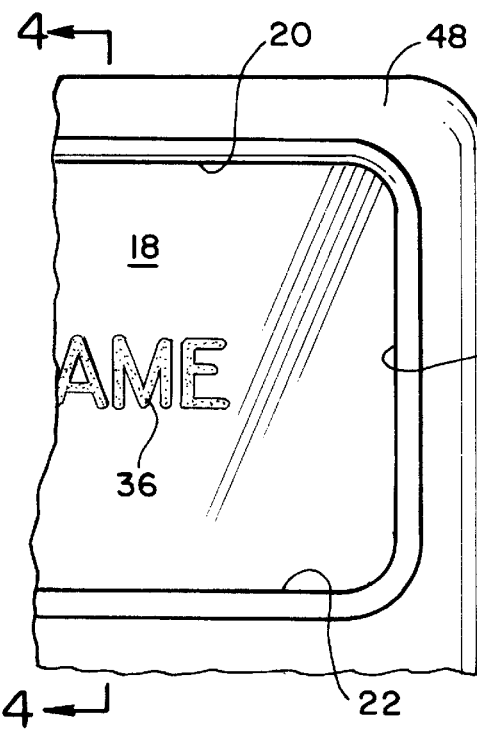
FIG. 2 is a partial view of the right corner of the FIG. 1 calculator, on an enlarged scale, and as taken along line 2—2 of FIG. 1.

A first and well known display component of calculator 10 is that providing the keyboard-produced numbers or numerical content 16 and consists of glass panels 28 and 30 between which are liquid crystal element means 32 electrically connected, as at 34, to calculator batteries (not shown). The calculator 10 is to be understood as viewed from left to right as depicted in FIG. 4, and thus the glass panels 28, 30 are perceived as foreground of the display screen 18 consisting in part of these glass panels.

Completing the display screen 18 is a second background-observed indicia, denominated as "PRODUCT NAME" and designated 36, which is printed or otherwise appropriately reproduced on an outwardly facing surface 38 of an opaque cardboard panel 40 disposed in a clearance position rearwardly of the foreground panels 28, 30. In practice, the indicia 36 will be confined primarily to letters or text, as distinguished from the numerical content 16 of the foreground glass panels 28, 30.

The inventive display of calculator 10 is shown in FIG. 3 and consists of the numbers 16 in a foreground display position and, through clear areas 42 of the glass panels 28, 30 readily perceived text 36 in a background display position.

Underlying the present invention is the recognition that, although the numbers 16 and text 36 are superimposed on each other, the distinct character of numbers in relation to letters enables the viewer to look beyond the numbers 16 and still effectively "read" the text 36 from the unobscured portions thereof seen through the clear glass areas 42. Accordingly, the calculator 10 has significant utility as an advertising premium for a product identified by the "PRINTED NAME" or otherwise presenting an appropriate commercial message.

For completeness' sake it is noted that in a commercial embodiment a plastic rear cover 44 is secured rearwardly of the housing rear and front panels 46 and 48, respectively, and supports a cardboard shim 50 with bulk which added to the lesser bulk of the cardboard panel 40 fills the compartment 52 behind glass panel 30.

While the calculator for providing the within inventive display herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A commercial message-imparting calculator of a type sized to be hand held and using a keyboard to position numerical indicia on a display screen, said calculator comprising a housing having spaced-apart top, bottom and opposite edges bounding a display opening above said keyboard, a clear glass panel means serving as a first component of said display screen disposed in said display opening, a first foreground-observed indicia confined to content of a numerical nature positioned by operation of said keyboard on said clear glass panel means, and a second background-observed indicia primarily confined to content of a textual nature imprinted on an opaque second panel serving as a second component of said display screen disposed in a clearance position rearwardly of said clear glass panel means, whereby there is simultaneously displayed on said display screen said numerical indicia as foreground and through clear areas of said glass panel means said textual indicia as background and said numerical and textual content differences serve to identify said textual content as a commercial message.

* * * * *